United States Patent [19]
Kakemizu et al.

[11] Patent Number: 5,295,177
[45] Date of Patent: Mar. 15, 1994

[54] AUTOMATIC TERMINAL START/STOP VERIFICATION SYSTEM USING CALL PROCESSING SIMULATOR

[75] Inventors: Mitsuaki Kakemizu; Yasuo Iwami, both of Kawasaki, Japan; Junichi Yamazaki, Red Bank, N.J.; Yoshiharu Sato, Kawasaki, Japan

[73] Assignee: Fujitsu Limited, Kawasaki, Japan

[21] Appl. No.: 851,021

[22] Filed: Mar. 13, 1992

[30] Foreign Application Priority Data

Mar. 15, 1991 [JP] Japan .................................. 3-074459

[51] Int. Cl.⁵ ............................................ H04M 3/22
[52] U.S. Cl. ...................................................... 379/17
[58] Field of Search ....................... 379/17, 32, 34, 10, 379/11; 375/12, 15

[56] References Cited

U.S. PATENT DOCUMENTS 4,640,784 7/1987 Lehnert et al. ...................... 379/11
4,670,897 6/1987 Parsons et al. ......................... 379/17

Primary Examiner—Curtis Kuntz
Assistant Examiner—Paul Loomis
Attorney, Agent, or Firm—Staas & Halsey

[57] ABSTRACT

In an automatic terminal start/stop verification system, a terminal start/stop simulation unit which simulates a task module of a call processing program for an exchange. The exchange has call processors which process and control calls, terminals, line processors controlled by the call processors to control the terminals, and a terminal management data file which has data on the busy/idle states of the terminals, a start/stop write macro name holding unit which holds the names of macros for the writing of start or stopping to the terminal management data file, and a start/stop order name holding unit which holds the names of orders for start or stop of the line processors. The terminal start/stop simulation unit automatically detects errors in the task module by referring to the start/stop write macro name holding unit and the start/stop order name holding unit.

2 Claims, 13 Drawing Sheets

Fig. 9A  TASK MODULE IN CALL PROCESSING PROGRAM WITHOUT MALFUNCTION

Fig. 9B

```
        %START 2. DREN  : AN EXTENSION SET LC IS SET IN C2 AREA TO
                          REWRITE BICT (IDLE→BUSY)
        %HUNT LC. C2    : A RINGER IS RINGING AT A TERMINAL WHERE SETTING
                          IS OVER IN C2 AREA
        %RGHNT C2       : A TERMINAL LPR WHERE SETTING IS OVER IN C2
        %STCHG 3          AREA, IS STARTED
        %LCST C2        : A RINGING TONE RBT IS RELEASED TO A TERMINAL
        %PATH SET.RBT.C1: WHERE SETTING IS OVER IN C1 AREA
        %END            : A TASK TABLE HAS BEEN FINISHED

%START 3. LANS  : A RINGER OF A TERMINAL WHERE SETTING IS OVER
                          IN C2 AREA IS STOPPED
        %RGIDL C2
        %STCHG 4        : A PATH IS PROVIDED FROM A TERMINAL WHERE SETTING
        %IDLE C3          IS OVER IN C2 AREA TO A TERMINAL WHERE SETTIG
        %PATH C2. C1      IS OVER IN C1 AREA
        %PATH C1. C2    : A PATH IS PROVIDED FROM A TERMINAL WHERE SETTING
        %END              IS OVER IN C1 AREA TO A TERMINAL WHERE SETTING
                          IS OVER IN C2 AREA
```

Fig. 9C

%START 4, LNON :
%IDLE C1 : BICT IS REWRITTEN TO A TERMINAL WHERE SETTING IS OVER C1 AREA (BUSY→IDLE)
%IDLE C2 : BICT IS REWRITTEN TO A TERMINAL WHERE SETTING IS OVER IN C2 AREA (BUSY→IDLE)
%PATH RST..C1 : A PATH IS RELEASED TO A TERMINAL WHERE SETTING IS OVER IN C1 AREA
%PATH RST..C2 : A PATH IS RELEASED TO A TERMINAL WHERE SETTING IS OVER IN C2 AREA
%END IDLE : CALL IS RELEASED (CDB IS RELEASED)

AUTOMATIC TERMINAL START/STOP VERIFICATION SYSTEM USING CALL PROCESSING SIMULATOR

BACKGROUND OF THE INVENTION

1. Field of the Invention

The present invention relates to an automatic terminal start/stop verification system using an exchange call processor, and more particularly, to a system for automatically detecting an error in a start control and stop control of terminals when supervising a task module of a call processing program.

2. Description of the Related Arts

In an exchange, call processing is executed according to a program, and since this call processing covers a wide range of subjects, the call processing program includes a massive amount of data. Therefore, there is a need to easily determine errors in a start control and/or a stop control of terminals in a subscriber circuit or the like, by the call processing simulator.

An exchange unit generally includes a main processor MPR, a plurality of call processors CPR, and a plurality of line processors LPR having a plurality of subscriber circuits and various kinds of trunks. The respective network paths are controlled by call processors, to form a communication path between subscribers. Each subscriber circuit includes a line processor and receives a plurality of subscriber lines, to each of which a data terminal is connected via a telephone set or a modem. Also, a trunk having a line processor is connected to other exchange units via a repeated repeater, or trunk, line. Namely, a terminal of the exchange unit contains a subscriber circuit having subscriber lines and a trunk having repeated lines, and the unit is provided with a terminal control data file unit BICT for holding data controlling the states of these terminals.

One line processor of the subscriber circuit and the other line processor of the trunk are controlled by a call processor, to control a start/stop operation of terminals, and the terminal control data file unit controls a busy/idle state of the terminal. Therefore, both when the line processors are started and when they are stopped, the call processor writes data in both cases via a main processor MPR.

Since the call processing program performing a control of an exchange unit including a main processor and a plurality of call processors and line processors, executes a very large number of call processing procedures, the above programs include a very large numbered processing procedures. Therefore, the call processing program is conventionally composed of task modules, and a programmer creates and debugs a call processing program by using each task module unit.

As described above, the call processing program is created by using each task module unit. The task module is executed by an exchange unit, to be verified whether or not a terminal such as a subscriber circuit has been normally started or stopped. Various kinds of task modules are created in parallel, and the respective task modules are executed simultaneously therewith by a plurality of exchange units, to thereby promote the development of a call processing program. Nevertheless, since the number of test exchange units is limited, it is practically difficult to simultaneously debug the task modules. Namely, a problem arises in that the progress of the call processing program development depends upon the number of available test exchange units.

SUMMARY OF THE INVENTION

An object of the present invention is to provide a system for automatically detecting an error in a start/stop control of a terminal, by using a call processing simulator.

In accordance with the present invention, there is provided an automatic terminal start/stop verification system by a call processing simulator that includes: a terminal start/stop simulation unit for simulating a task module forming a call processing program for an exchange unit having call processors which process and control calls, line processors controlled by the call processors to control terminals, and a terminal management data file having data on the busy/idle states of the terminals; a start/stop write macro identifier holding unit for holding the macro identifier for writing a start or stop to the terminal management data file; a start/stop order identifier holding unit (LPR) holding an identifier of orders for starting or stopping the line processors; wherein the terminal start/stop simulation unit automatically detects, with reference to the start/stop write macro identifier holding unit and the start/stop order identifier holding unit from the task module, an omission of a start or stop write to the terminal management data file for executing a start or stop of the terminal, as well as omission of start or stop order to the line processors.

The mode of operation in an embodiment of the present invention will be described as follows.

The terminal start/stop simulation unit can be implemented using the functions of a general-purpose computer. The start/stop write macro identifier holding unit holds the identification names of macros needed for a write of a start or stop to the terminal management data file. The start/stop order identifier holding unit holds the identifier of orders for a start or stop of the line processor from the call processor. Thus, referring to the start/stop write macro identifier holding unit and start/stop order identifier holding unit, the terminal start/stop simulation unit determines whether the macro or order extracted from the task module of the call processing program is precisely a macro for a write of start or stop to the terminal management data file or an order for a start or stop of the line processor. If the macro and order have a predetermined sequential relationship, for example, when an order for a stop exists after the line processor is started, the terminal start/stop simulation unit will determine that the operation is normal, but if an order for a stop is not found, and the operation shifts to a termination state or other state, it will be determined that a malfunction in the course of stop control has occurred.

Similarly, the data holding unit provided in the terminal start/stop simulation unit refers to the macro and order identifier extracted from the task module as previously described, determines whether the macro or order extracted from the task module is a macro for a start/stop write to the terminal management data or an identification for a start/stop of the line processor, and holds the start/stop data based on the result. Thus, the data holding unit discriminates the state transition of the terminal and determines the result when a transition of a termination of one state is discriminated, thereby detecting a malfunction in the course of a start control and stop control of the terminal.

In accordance with the present invention, there is also provided an automatic terminal start/stop verification system by a call processing simulator, which extracts a macro or order from the task module of the call processing program by using the terminal start/stop simulation unit, refers to the macro names and order names held in the start/stop write macro name holding unit and start/stop order name holding unit, to determine whether the extracted macro or order is a BICT start/stop write macro or LPR start/stop order, and determines the terminal state and line processor (LPR) state at each end of one state change (% END), to verify whether or not a start and stop are included in the task module. According to the present invention, a general-purpose computer can be used to easily verify the task module and automatically detect bugs, and thus the present invention advantageously permits an easy development of a call processing simulator.

BRIEF DESCRIPTION OF THE DRAWINGS

FIG. 7 is a combination of FIGS. 7A and 7B

PREFERRED EMBODIMENTS OF THE INVENTION

With reference to a conventional exchange unit system, the present invention will be described in more detail hereinafter.

Figure 1:
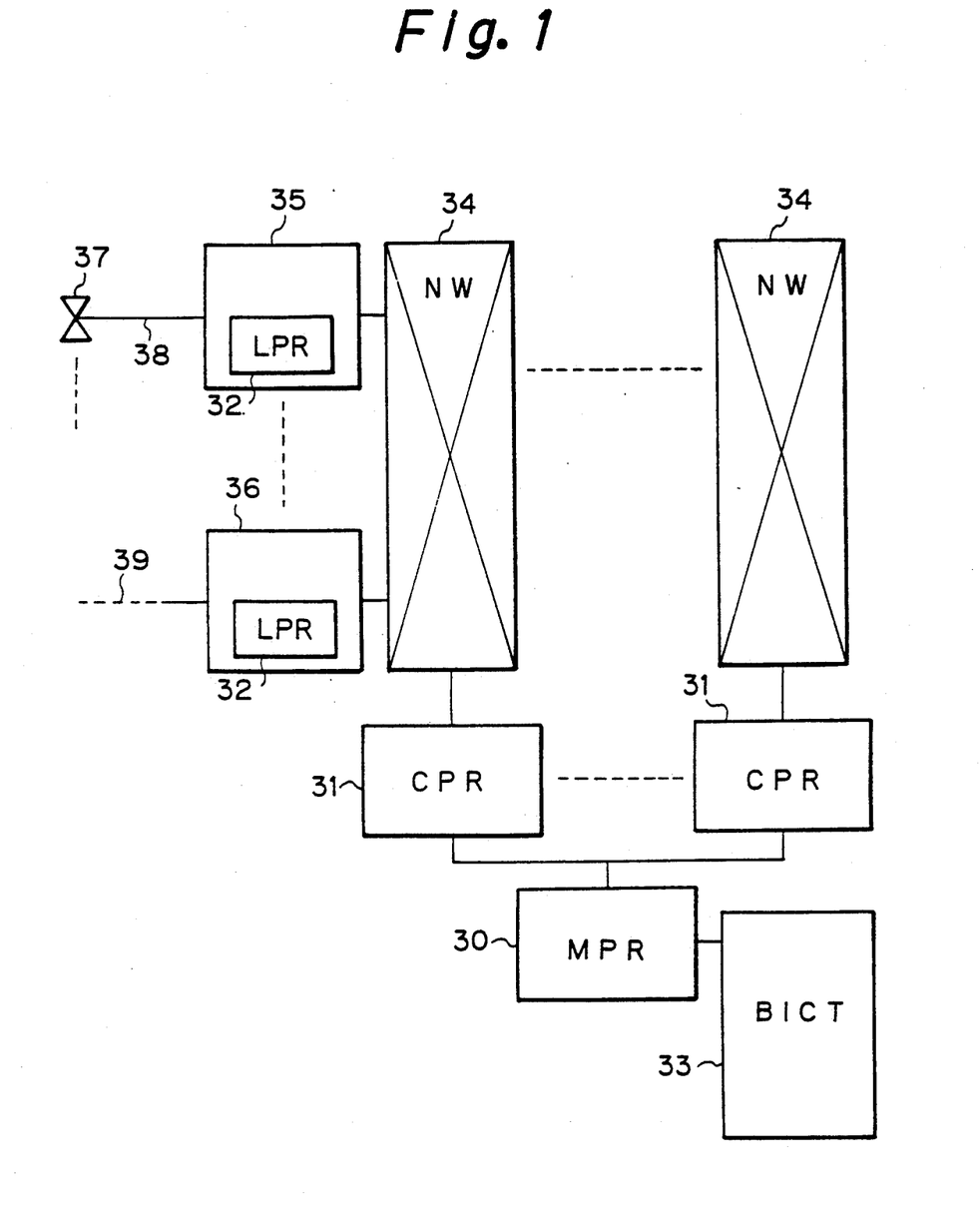
FIG. 1 is a view showing an outline of a configuration of a conventional exchange system.

The exchange unit comprises, as shown in FIG. 1, for example, a main processor (MPR) 30, a plurality of call processors (CPR) 31, and respective line processors (LPR) 32 of a plurality of subscriber circuits 35, and various trunks 36. The call processors 31 control the respective paths of networks (NW) 34 to form a path, for example, for communication between subscribers. The subscriber circuit 35 including the line processor 32 receives a plurality of subscriber's lines 38, to each of which a data terminal is connected via a telephone set 37 or a modem (modulator-demodulator). Also, the trunk 36 including a line processor 32 is connected to another exchange via a trunk line 39. There is further provided a terminal management data file (BICT) 33 to hold data on the busy/idle states of terminals, such as the subscriber circuits 35 each including a subscriber's line 38, etc., trunks 36 each including a trunk line 39, etc., and the like.

The line processors 32 of the subscriber circuit 35 and those of the trunk 36 are controlled by the call processor 31 to control the start and stop of a terminal. Since the terminal management data file 33 folds the data on the busy/idle state of the terminal, the call processor 31 will write the data on the start and stop of the line processor 32 to the terminal management data file 33 via the main processor 30.

The call processing program for controlling an exchange including the aforementioned main processor 30, a plurality of call processors 31, and a plurality of line processors 32 is likely to include a very large number of programs for the execution of a wide variety of call processing. Thus, the call processing program is normally composed of task modules, and the programmer creates and debugs a call processing program by each unit of the task module.

The call processing program is created in units of a task module. The task module is executed by an exchange to control BICT or network or various subscribers and trunks via LPR. Thus, task modules control switching services, for example, call back transfer. As users demand various switching services, many task modules must be developed. Nevertheless, since the number of test exchanges is, limited, it is practically, very difficult to simultaneously debug the task modules. That is, a problem arises in that the progress of the call processing program development depends upon the number of available test exchange units.

An object of the present invention is to provide a system which automatically detects an error in a start/-stop control of a terminal, by using a call processing simulator.

Figure 2:
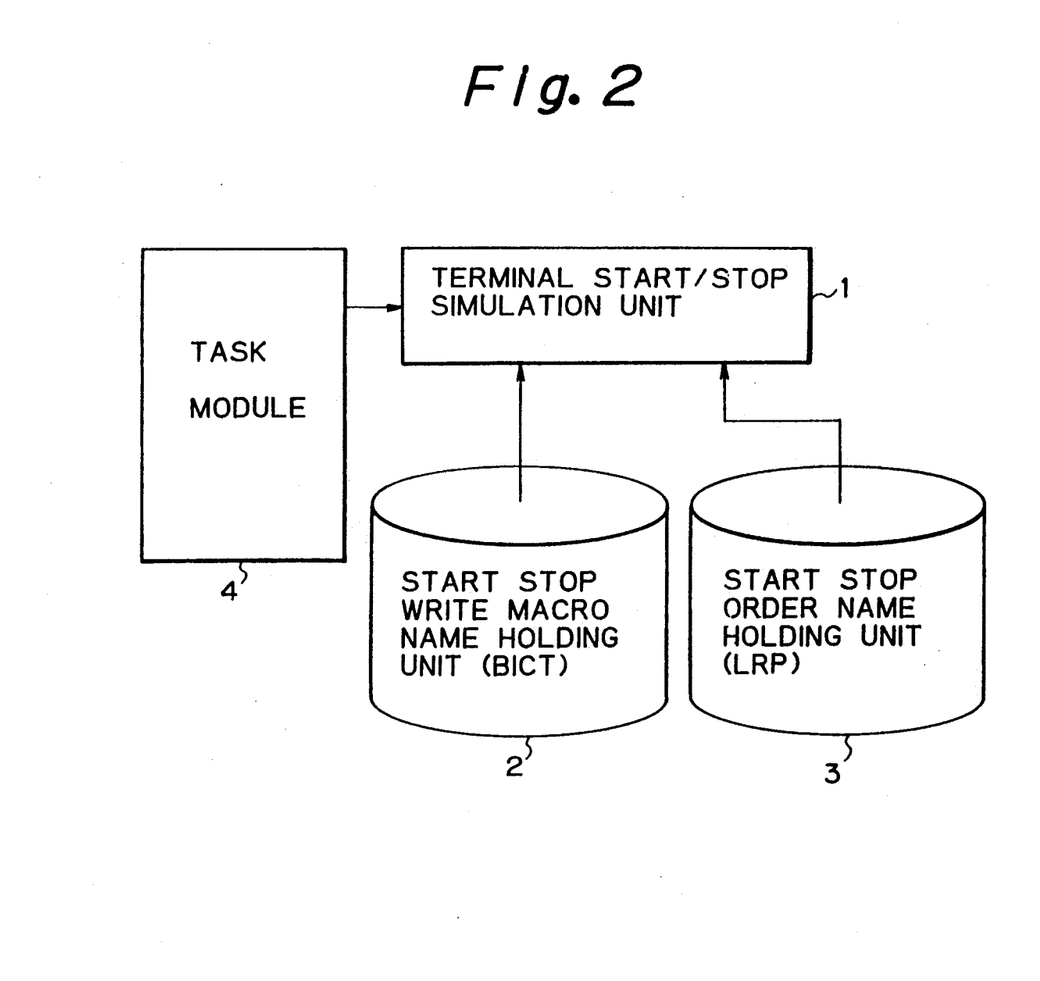
FIG. 2 is a view showing the operation of an embodiment in accordance with the present invention.

The above object can be attained by providing, according to the present invention, an automatic terminal start/stop verification system, described below with reference to FIG. 2. The system comprises a terminal start/stop simulation unit 1 simulating a task module 4 of a call processing program for an exchange having call processors which process and control calls, line processors controlled by the call processors to control terminals, and a terminal management data file having the data on the busy/idle states of the terminals; a start/-stop write macro name holding unit 2 holding the names of macros for a write of a start or stop to the terminal management data file; a start/stop order name holding unit 3 holding the names of orders for a start or stop of the line processors; the terminal start/stop simulation unit 1 automatically detecting, by reference of the task module 4 to the start/stop write macro name holding unit 2 and the start/stop order name holder unit 3, an omission of a start or stop write to the terminal management data file for a start or stop of the terminal, and an omission of a start or stop order to the line processors.

Also the present invention provides an automatic terminal start/stop verification system wherein, as it is provided with a data holding unit for temporarily holding terminal information, the terminal start/stop simulation unit 1 holds start and stop data for each terminal class, based on the name of a macro for a start or stop write to the terminal management data file and the name of a start or stop order to the line processor, which are extracted from the task module 4 of the call processing program, to thus automatically detect, based on the pattern of the start and stop dta, an omission of task macro or order for a start or stop of the terminal.

The terminal start/stop simulation unit 1 can be formed by using the functions of a general-purpose computer. The start/stop write macro name holding unit 2 holds the names of macros needed for a write of a start or stop to the terminal management data file, and the start/stop order name holding unit 3 holes the names of orders for a start or stop of the line processor from the call processor. Thus, referring to the start/stop write macro name holding unit 2 and start/stop order name holding unit 3, the terminal start/stop simulation unit 1 determines whether the macro or order extracted from the task module 4 of the call processing program is precisely a macro for a write of a start or stop to the terminal management data file, or is an order for a start or stop of the line processor. If the macro and order have a predetermined sequential relationship, for example, when an order for a stop exists after the line processor is started, the terminal start/stop simulation unit 1 will determine that the operation is successful; if, however, this order for a stop is not found and the operation goes to an end or other state, it will be decided that a failure of the stop control has occurred.

Similarly, the data holding unit provided in the terminal start/stop simulation unit 1 refers to the macro and order names extracted from the task module 4, as previously described, determines whether the macro or order extracted from the task module 4 is a macro for a start/stop write to the terminal management data file or an order for a start/stop of the line processor, and holds the start/stop data based on the result. Thus, the data holding unit discriminates the state change of the terminal and determines the result of the end of one state change, thereby detecting any failure in the control of a start and stop of the terminal.

Figure 3:
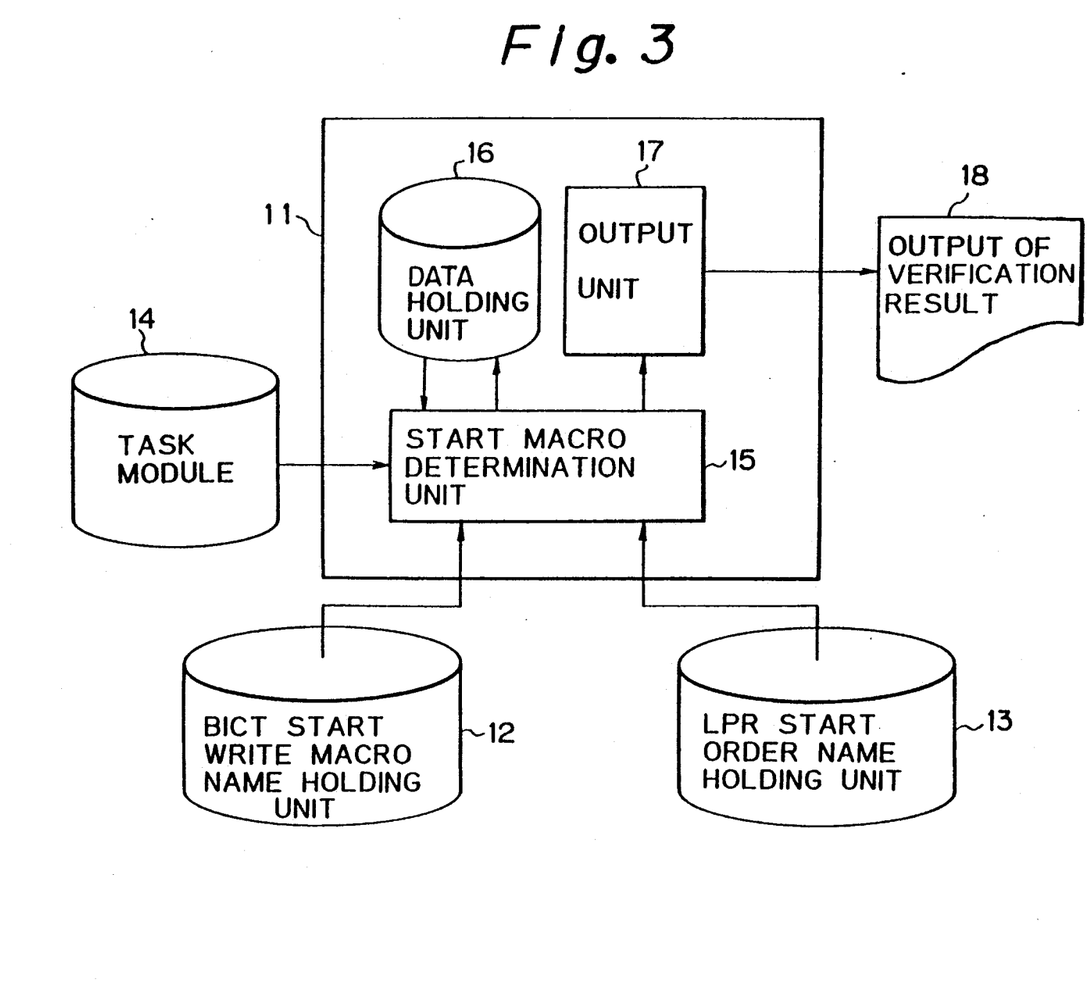
FIG. 3 is a view showing the configuration of an automatic verification system in accordance with the present invention.

FIG. 3 is an explanatory drawing of one embodiment of the present invention, showing a system configuration for a terminal start. In FIG. 3, reference numeral 11 indicates a terminal start simulation unit composed of a general-purpose computer, etc., 12 is a BICT (terminal management data file) start write macro name holding unit, 3 is an LPR (line processor) start order name holding unit, 14 is a task module of call processing program, 15 is a start macro determination unit, 16 is a data holding unit temporarily holding terminal information, 17 is an output unit, and 18 is an output of a verification result.

The start macro judgement unit 15 of the terminal start simulation unit 11 extracts a macro or order from the task module 14, refers to the macro and order names held in the BICT start write macro name holding unit 12 and LPR start order name holding unit 13, to determine whether or not the extracted macro or order is precisely the referred-to macro or order, follows the result to hold the data on whether or not the BICT and LPR start have been started, for each terminal class in the data holding unit 16, automatically detects, upon the end of one state change, any failure of a terminal start by referring to the contents of the data holding unit 16, and delivers the verification result to the output unit 17.

Figures 4, 4A:
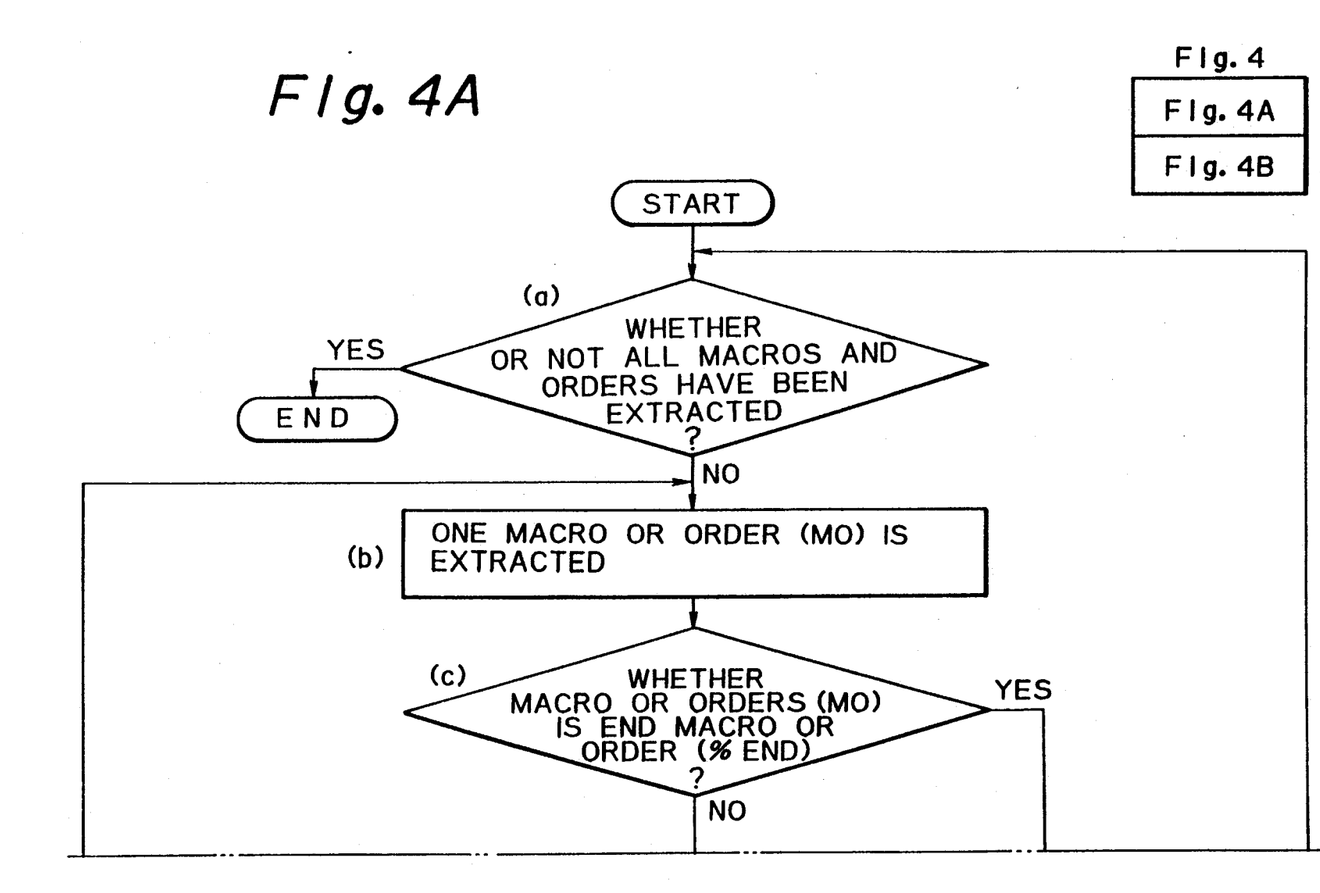
FIG. 4 is a combination of FIGS. 4A and 4B
FIGS. 4A and 4B and flow charts showing the operation of an embodiment in accordance with the present invention.
Figure 4B:
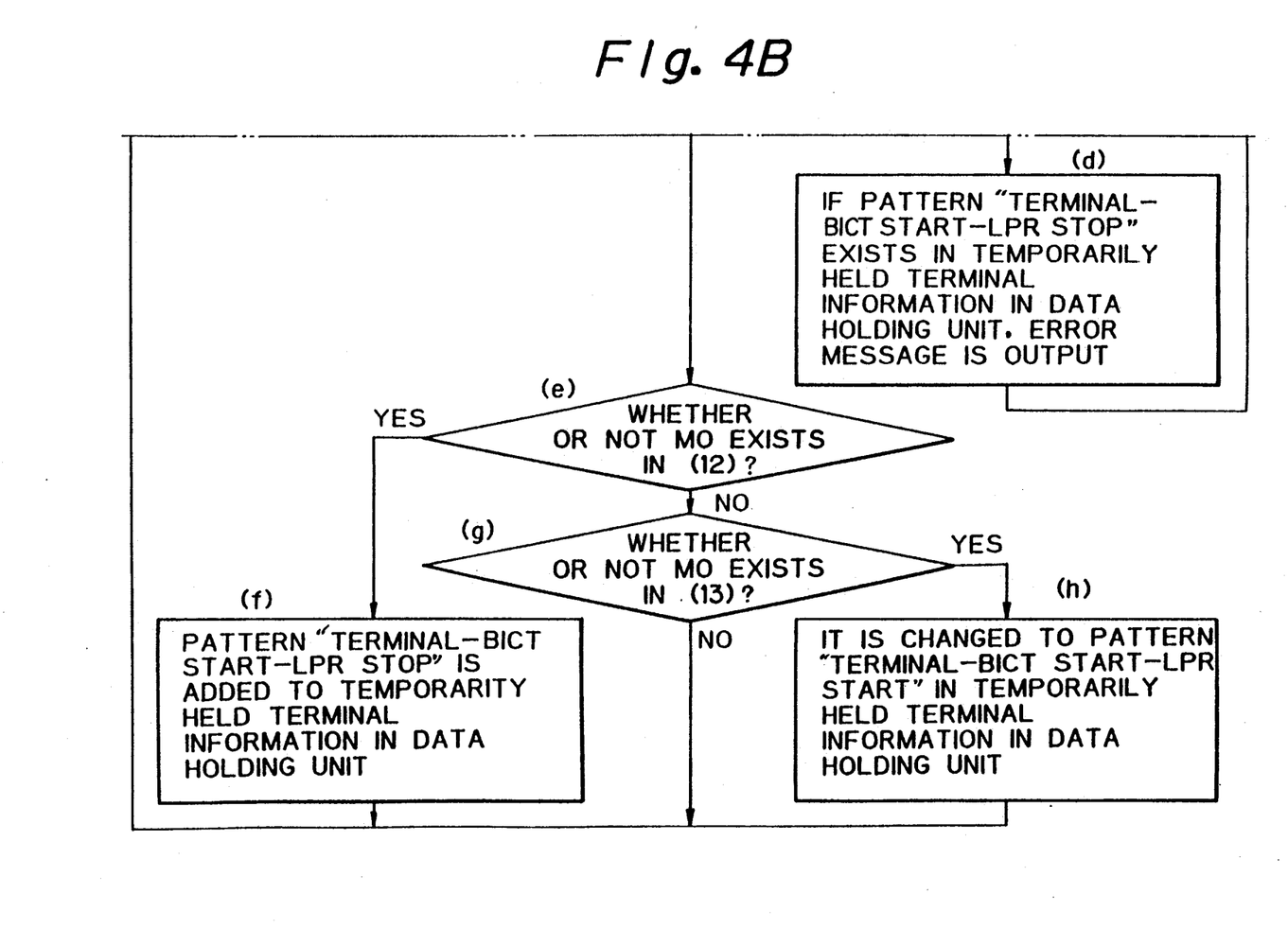

FIGS. 4A and 4B are flow charts of the operations in the first embodiment of the present invention. As shown, the terminal start simulation unit 11 determines whether or not all macros and orders have been extracted from the task module 14 (as in step (a)). When all macros and orders have been extracted, the operation goes to END, and if not, one macro or order (MO) is extracted (as in step (b)) and it is determined whether or not the macro or order (MO) is the end macro or order (% END) (as in step (c)). If the macro or order (MO) is the end (% END), it is determined whether or not a pattern "terminal-BICT start-LPR stop" (terminal start is written to the terminal management data file while the line processor is stopped) exists in the temporarily held terminal information in the data holding unit 16; the existence of the pattern means that LPR start has been omitted. In this case, an error message is delivered to the output unit 17 (as in step (d)) and the operation returns to step (a).

If the macro or order (MO) in consideration is not the end (% END), it is determined whether or not a macro or order (MO) exists in the BICT start write macro name holding unit 12 (as in step (e)), and if it exists, the pattern "terminal-BICT start-LPR stop" is added to the temporarily held terminal information in the data holding unit 16 (as in step (f)) and the operation returns to step (b). If the extracted macro or order (MO) is not found in the BICT start write name holding unit 12, it is determined whether or not the macro or order (MO) exists in the LPR start order name holding unit 13 (as in step (g)), and if so, it is changed to the pattern "terminal-BICT start-LPR stop" in the temporarily held terminal information in the data holding unit 16 (as in step (h)), and the operation returns to step (b).

Figure 5:
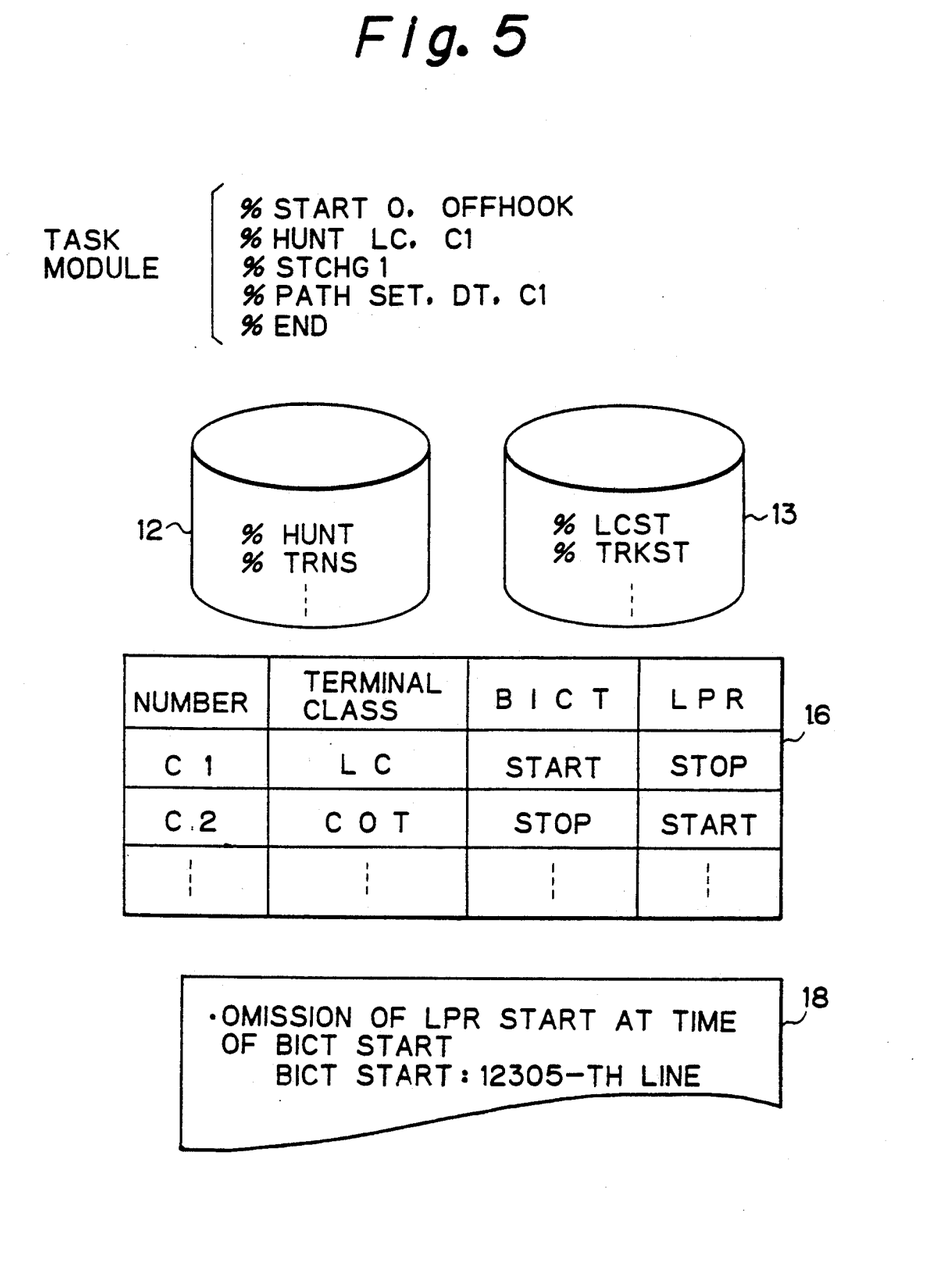
FIG. 5 is a view showing the operation of a terminal start, such as a task module, holding units of BICT, LPR and data, and a result of a verification.

FIG. 5 is an explanatory drawing of the terminal start, showing an example of each of the task module, BICT start write macro name holding unit 12, LPR start order name holding unit 13, data holding unit 16, and verification result 18. The "% START 0, OFF-HOOK" in the task module indicates a terminal start by the subscriber by taking the telephone handset off the hook, and "% HUNT LC, C1" indicates a macro for a hunt of a subscriber circuit LC for a number C1. The "% STCHG 1" indicates another call processing, and "% PATH SET, DT, C1" indicates a macro for setting a path for the number C1. The % END indicates a macro for an end of one state change.

FIG. 5 also shows the BICT start write macro name holding unit 12 holding macro names such as "% HUNT", "% TRNS", etc., as well as the LPR start order name holding unit 13 holding names of orders for a start of subscriber circuit LC ("% LCST"), start of trunk ("% TRKST"), etc. Also FIG. 5 shows the data holding unit 16 which holds, for a number C1, data "BICT start-LPR stop" for a subscriber circuit LC of terminal class under the macro "% HUNT LC, C1" and for a number C2, a data "BICT stop-LPR start" for a calling-side continuity test trunk COT for each terminal class.

In the case of the aforementioned task module, the start macro judgement unit 15 of the terminal start simulation unit 11 extracts one macro or order as in step (b) in FIG. 4 and determines whether or not the macro or order (MO) is the end macro or order (% END). Since the first "% START 0, OFFHOOK" in the task module is not the end (% END), and is not a BICT start write macro or LPR start order, a next macro or order (MO) is extracted. Since the macro or order (MO) is "% HUNT LC, C1" and a BICT start write macro, a "terminal (LC)-BICT start-LPR stop" is added to the data holding unit 16 for the number C1 as in step (f) in FIG. 4.

Since the next macro or order (MO) "% STCHG 1" and "% PATH SET, DT, C1" following the "% STCHG 1" is not a BICT start write macro or LPR start order, a further micro or order (MO) "% END" is extracted. The "% END" is a macro for an end of one state change. Thus, when the data holding unit 16 is referred to as in step (d) in FIG. 4, the pattern "terminal (LC)-BICT start-LPR stop" will be found there. In this case, an error message, for example, "omission of LPR start at time of BICT start, BICT start: 12305th line" is delivered as a verification result 18 at the output unit 17 of the terminal start simulation unit 11 as shown in the lower portion of FIG. 5.

If an order "% LCST C1" or the like exists, following, for example, "% HUNT LC, C1" in the aforementioned task module, the pattern "terminal (LC)-BICT start-LPR stop" in the data holding unit 16 is changed to a pattern "terminal (LC)-BICT start-LPR start" as in step (h) in FIG. 4. Namely, the LPR start order has not been omitted. Thus, when the end "% END" is extracted, no error message as in step (d) in FIG. 4 will be delivered.

Figure 6:
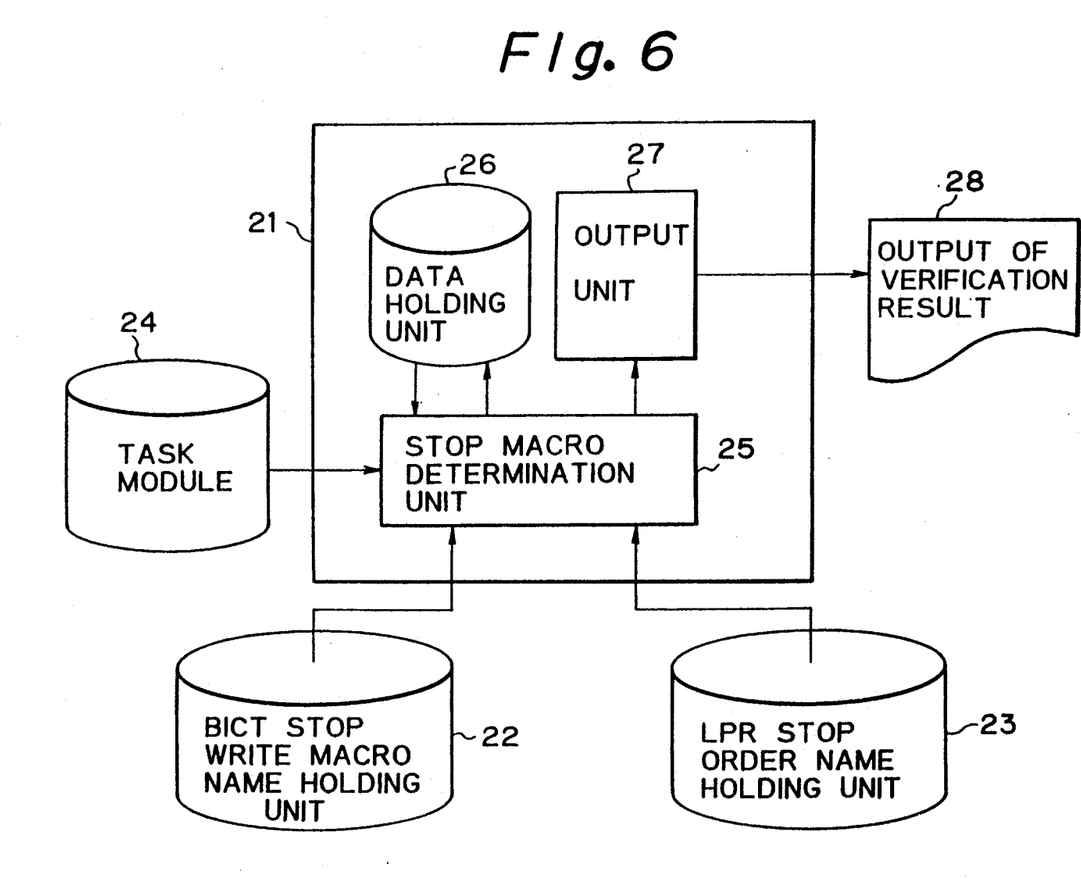
FIG. 6 is a view showing another embodiment of the invention in the case of a terminal stop.

FIG. 6 is an explanatory drawing of another embodiment of the present invention, showing a system configuration for a terminal stop. In FIG. 6, the reference numeral 21 indicates a terminal stop simulation unit composed of a general-purpose computer, etc., 22 a BICT (terminal management data file) stop write macro name holding unit, 23 an LPR (line processor) stop order name holding unit, 24 a task module of call processing program, 25 a stop macro determination unit, 26 a data holding unit temporarily holding terminal information, 27 an output unit, and 28 an output of a verification result.

The stop macro judgement unit 25 of the terminal stop simulation unit 22 extracts a macro or order from the task module 24, refers to the macro names and order names held in the BICT stop write macro name holding unit 22 and LPR stop order name holding unit 23, to determine whether or not the extracted macro or order is precisely the referred-to macro or order, follows the result to hold the data on whether or not the BICT and LPR have been stopped, for each terminal class in the data holding unit 26, automatically detects, upon the end of one state change, a failure of the terminal stop by referring to the contents of the data holding unit 26, and delivers the verification result to the output unit 27.

Figure 7A:
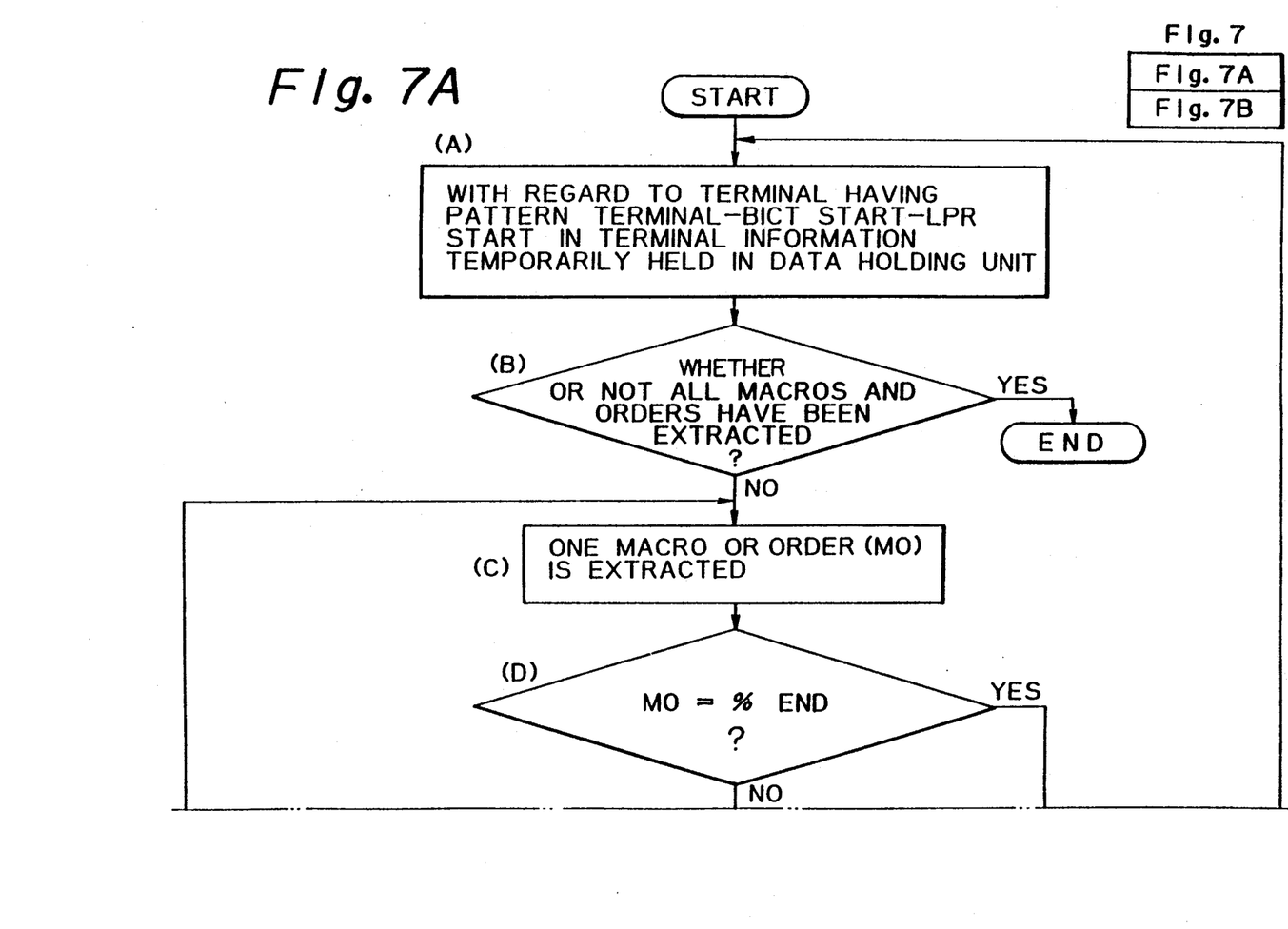
FIGS. 7A and 7B are flow charts showing the operation of another embodiment of FIG. 6.
Figure 7B:
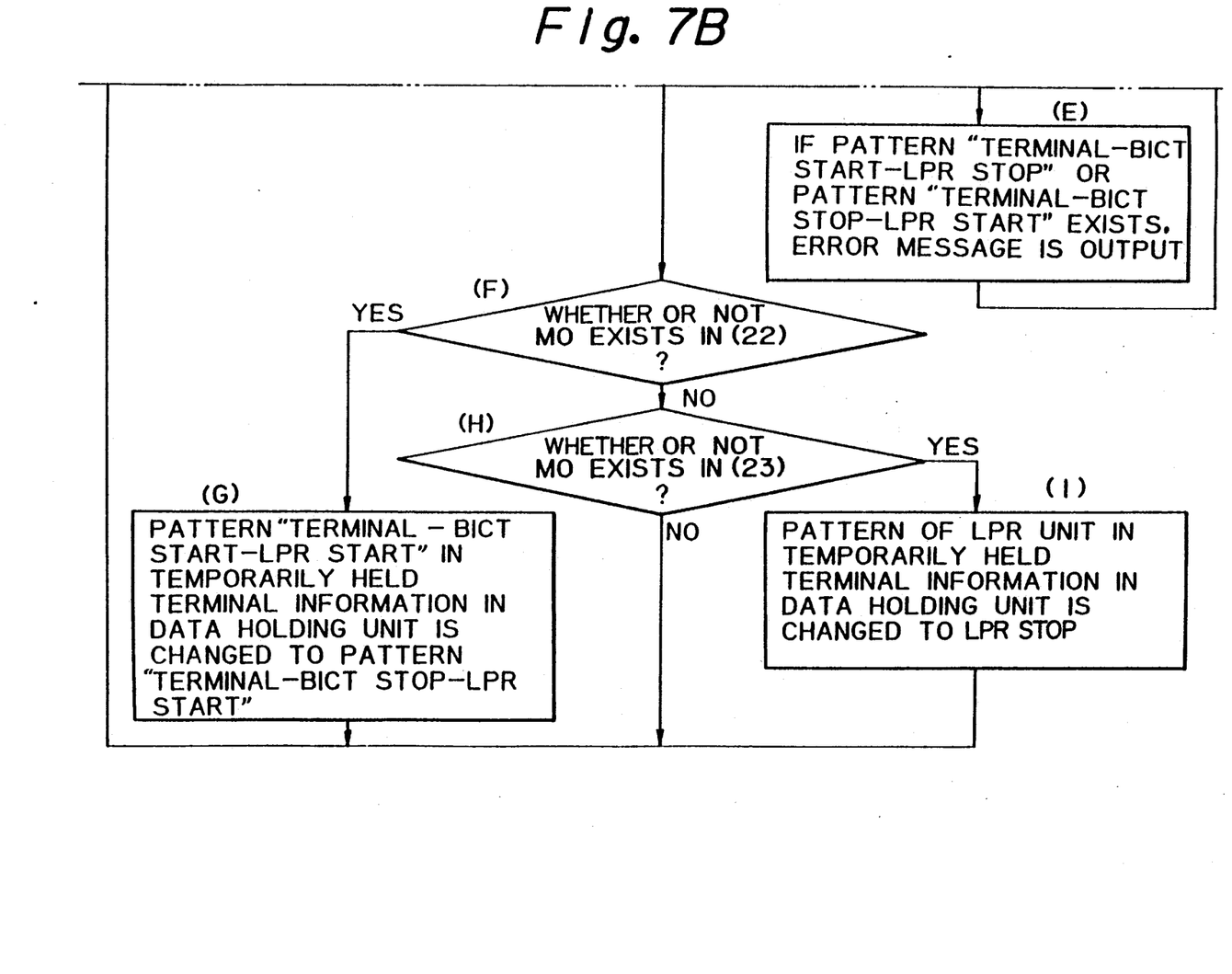

FIGS. 7A and 7B are flow charts of the operations in the second embodiment of the present invention in FIG. 6. For a terminal such as a subscriber circuit LC or the like having a pattern "terminal-BICT start-LPR start" in the terminal information temporarily held in the data holding unit 26 of the terminal stop simulation unit 21, the following processing is done (as in step (A)). First, it is determined whether or not all macros and orders have been extracted (as in step (B)), and if extracted, the operation goes to END. If not, one macro or order (MO) is extracted (as in step (C)). It is determined whether or not the macro or order (MO) is an end macro or order (% END) (as in step (D)). If so, and when a pattern "terminal-BICT start-LPR stop" or "terminal BICT stop-LPR start" is found in the temporarily held terminal information in the data holding unit 26, an error message is delivered (as in step (E)) and the operation returns to step (A).

If the macro or order (MO) is not the end (% END), it is determined whether or not a macro or order (MO) exists in the BICT stop write macro name holding unit 22 (as in step (F)). If so, the pattern "terminal-BICT start-LPR start" in the temporarily held terminal information in the data holding unit 26 is changed to a pattern "terminal-BICT stop-LPR start" (as in step (G)) and the operation returns to step (C). When the macro or order (MO) is not found in the BICT stop write macro name holding unit 22, it is determined whether or not it exists in the LPR stop order name holding unit 23 (as in step (H)). If so, the LPR pattern in the terminal information temporarily held in the data holding unit 26 is changed to "LPR stop"(as in step (I)). For example, the pattern "terminal-BICT stop-LPR start" changed in step (G) is changed to a pattern "terminal-BICT stop-LPR stop" and the operation returns to step (C).

Figure 8:
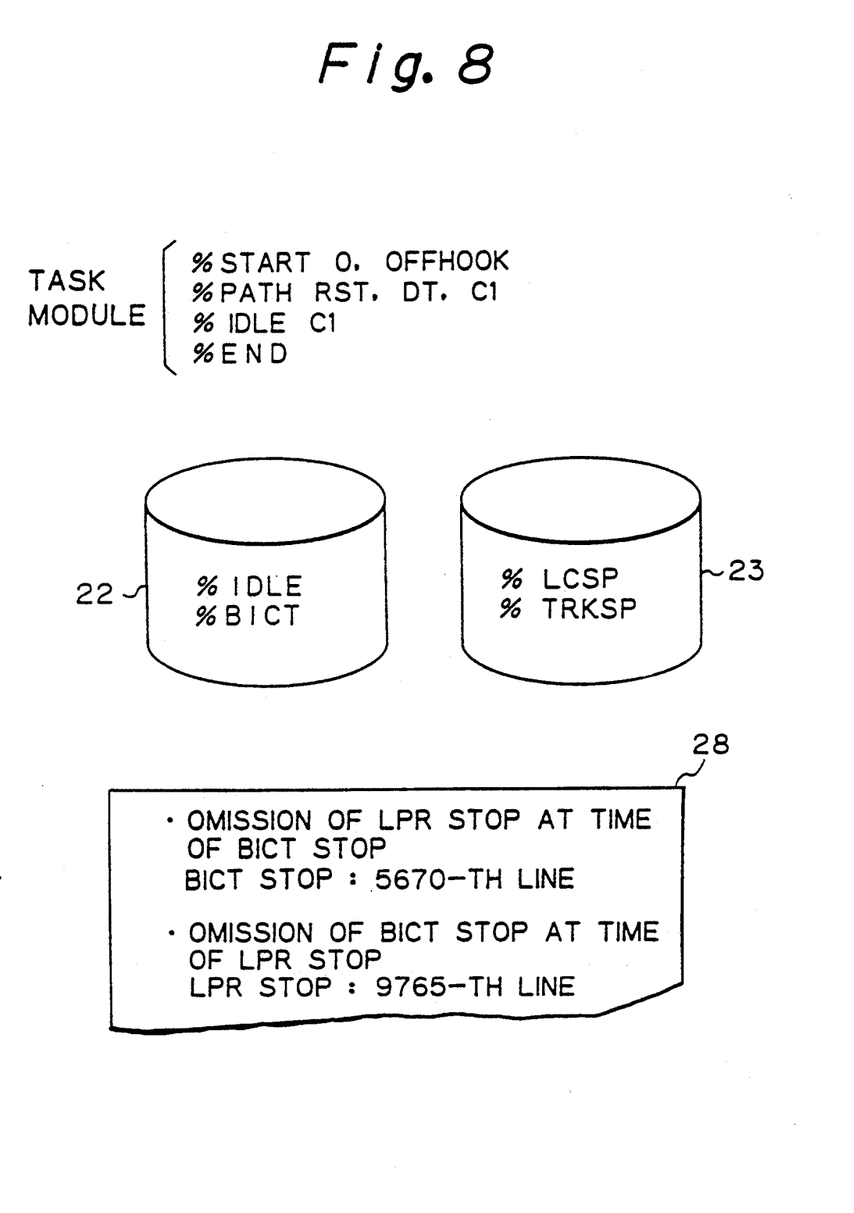
FIG. 8 is a view showing the operation of a terminal stop, such as a task module holding unit of BICT and LPR, and a result of a verification.

FIG. 8 explains the operation of a terminal stop. In this case, the task module includes "% START 0, OFF-HOOK", % PATH RST, DT, C1", "% IDLE C1" and "% END", stop macro names such as "% IDLE", "% BICT", etc. are held in the BICT stop write macro name holding unit 22, and the LPR stop order name holding unit 23 holds subscriber circuit LC stop and trunk stop such as "% LCSP", "% TRKSP", etc. as stop write macro names.

The stop macro determination unit 25 of the terminal stop simulation unit 21 refers to the data holding unit 26 as in step (A) in FIG. 7, extracts one macro or order (MO) from the task module 24 as in step (C), and makes determinations, as in decision steps (D), (F), (H), etc. Since the % START 0, OFFHOOK first extracted from the task module is not the end (% END) and is not a BICT stop write macro or LPR stop order, a next "% PATH RST, DT, C1" is extracted. Since, however, it is not the end (% END) and is not a BICT stop write macro or LPR stop order, "%IDLE C1" following "% PATH RST", DT, C1" is extracted. As this is a BICT stop write macro, the pattern "terminal-BICT start-LPR start in the data holding unit 26 will be changed to a pattern "terminal-BICT stop-LPR start" as in step (G).

Next, "% END" is selected. Since this indicates a macro for end of one state change, it is determined as in step (E) whether or not a pattern "terminal-BICT start-LPR stop " or "terminal-BICT stop-LPR start" exists in the terminal information temporarily held in the data holding unit 26. Since, however, the pattern in the data holding unit 26 is "terminal-BICT stop-LPR start" as aforementioned, a message including, for example, "Omission of LPR stop at time of BICT stop, BICT stop: 5670th line" as shown in the lower portion of FIG. 8 is delivered as a verification result 28 by the output unit 27 of the terminal stop simulation unit 21 (FIG. 6).

If an order "% LCSP C1" , for example, is included following "% IDLE C1" in the task module in FIG. 8, "% LCSP" is held in the LPR stop order name holding unit 23 and it is determined that the order "% LCSP C1" is for LPR stop, and "LPR start" in the column of number C1 in the data holding unit 26 will be changed to "LPR stop" as in step (I) in FIG. 7B. Hence, since the terminal information temporarily held in the data holding unit 26 becomes "terminal-BICT stop-LPR stop" when the end "% END" is extracted, no error message will be delivered.

Figure 9A:
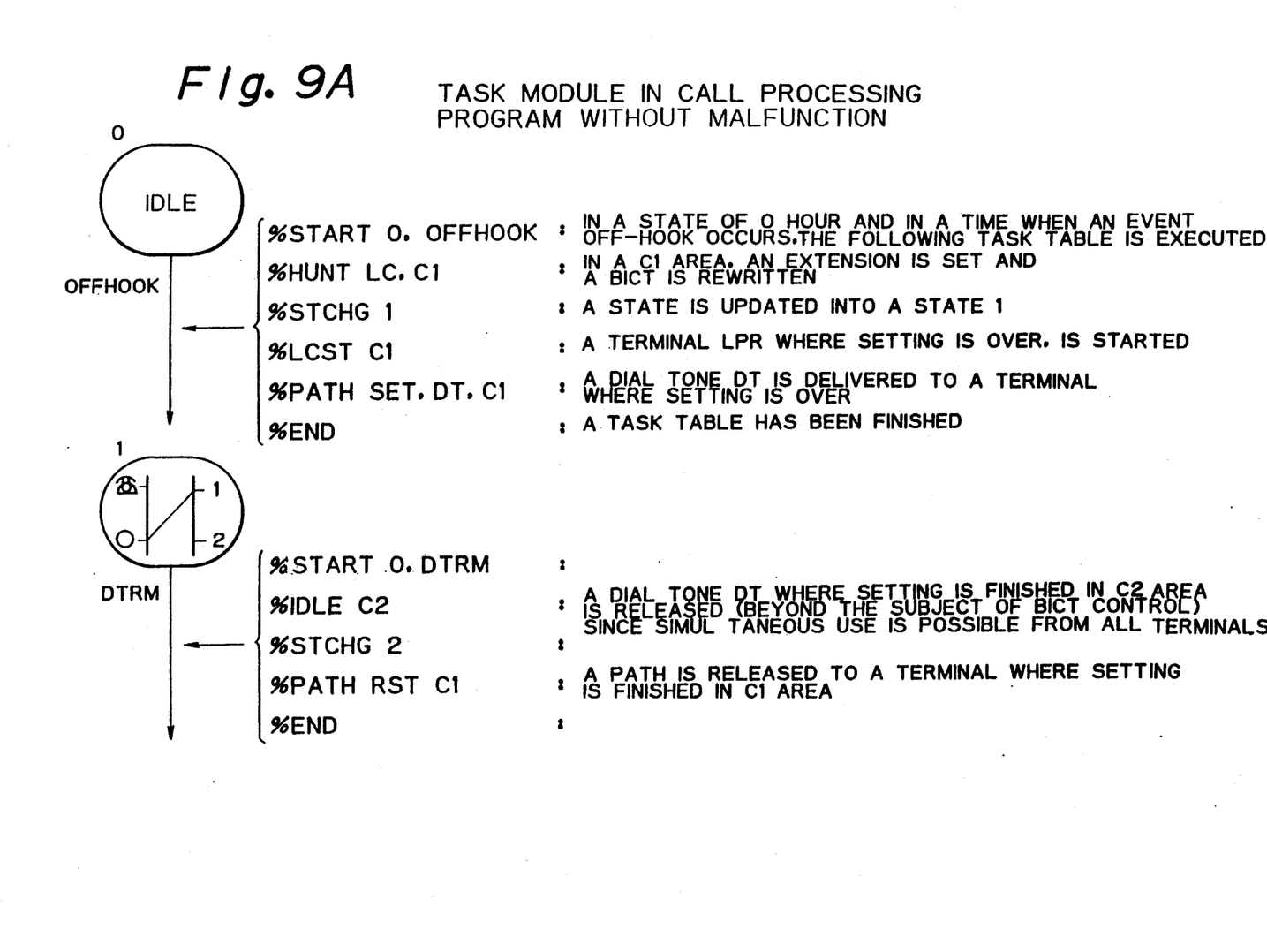
FIGS. 9A to 9C are views showing an embodiment of a task module of a call processing program without a malfunction in accordance with the present invention.
Figure 9B:
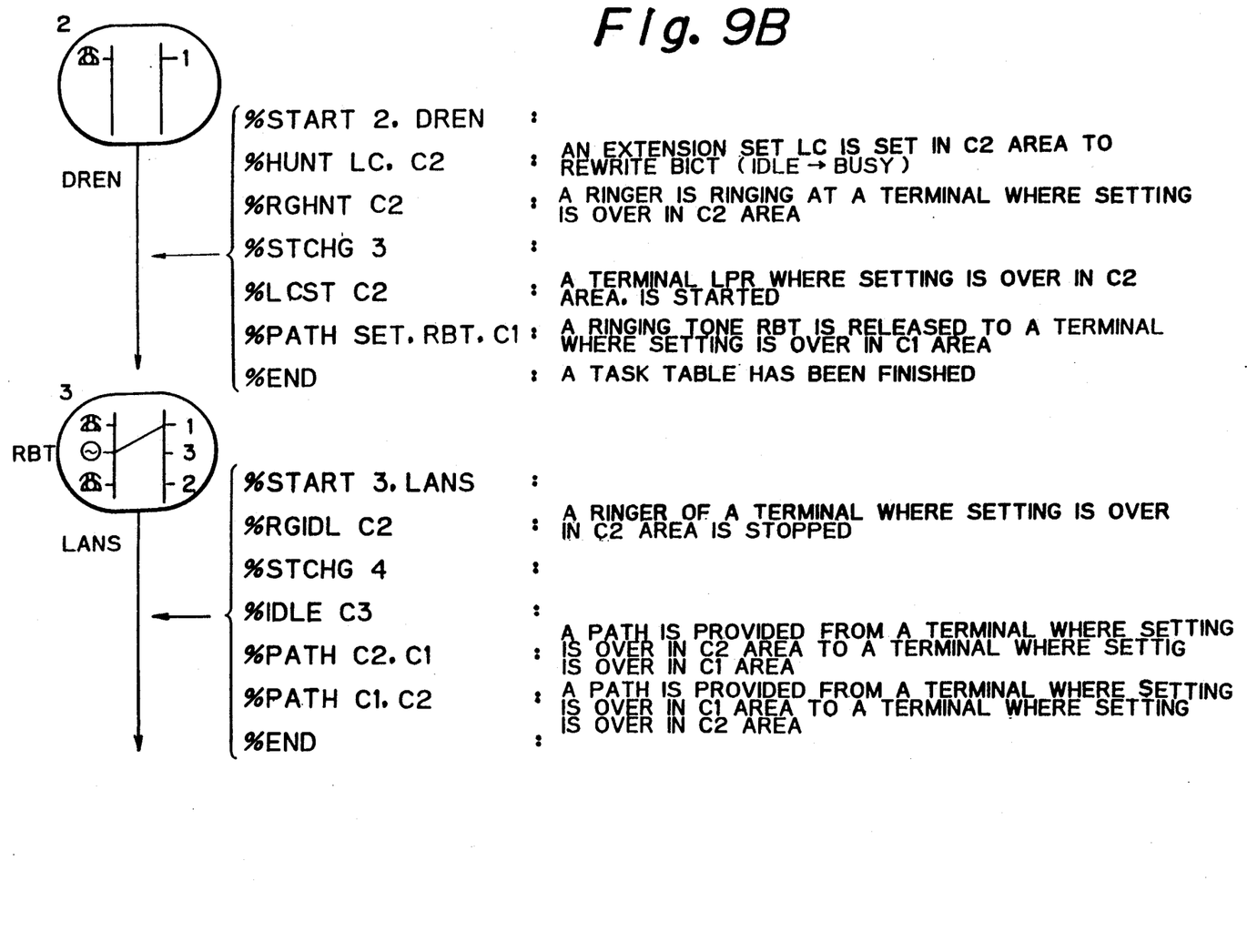
Figure 9C:
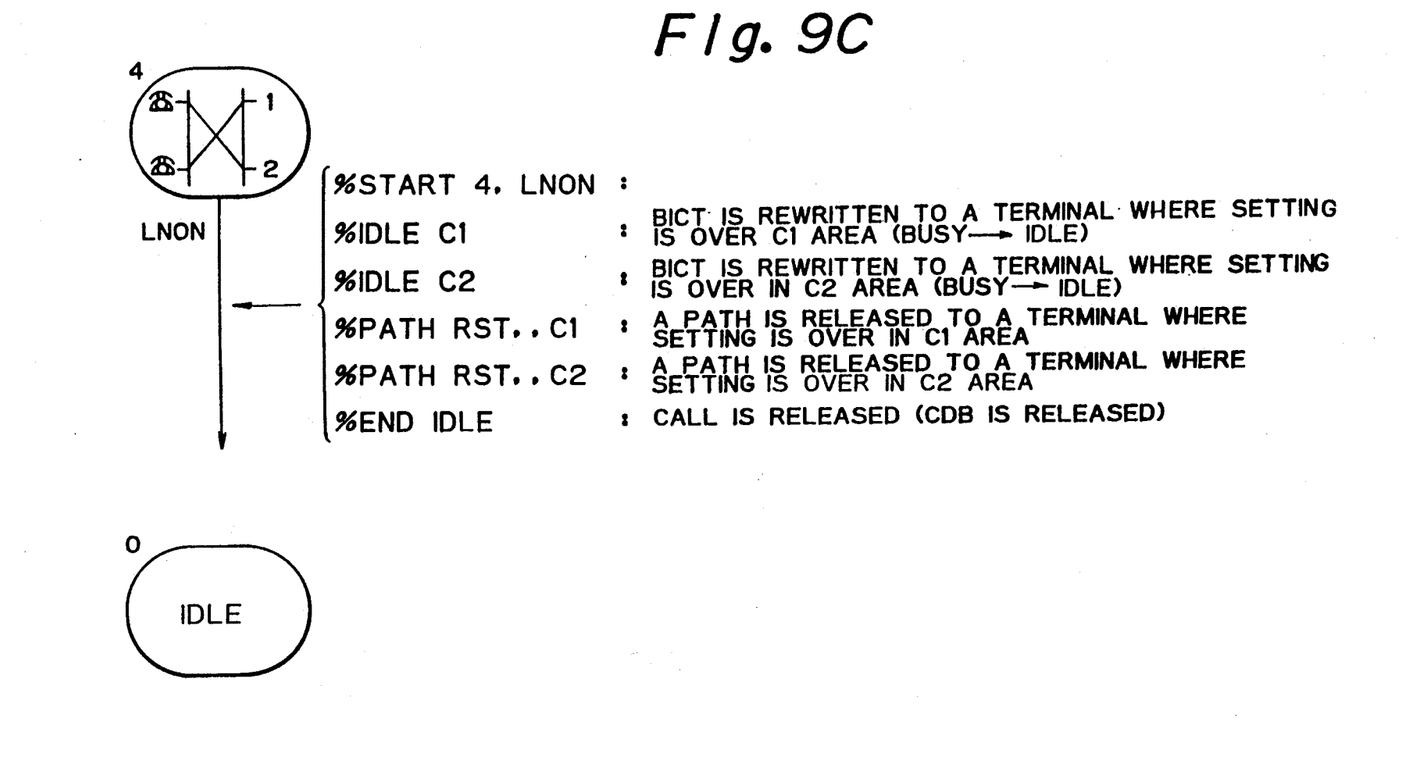

FIGS. 9A to 9C are views showing an embodiment of the present invention, which shows a transition from an initial idle state to a subsequent idle state in a task module of a call processing program without a malfunction.

The following description explains how extension terminals A and B accommodated in an exchange unit are controlled by the exchange unit when the task module shown in FIGS. 9A to 9C is executed in the exchange unit by operation of the terminals A and B.

0→1 state: By an OFF-HOOK operation of A terminal, a dial tone (DT) is received by A terminal.

1→2 state: A terminal inputs a first digit of a telephone number representing B terminal and the DT is cut off.

2→3 state: A terminal inputs all digits of the telephone number of B terminal, the exchange unit specifies B terminal to start ringing of B terminal and transits A terminal to a state that a ring-back tone (RBT) is received at A terminal.

3→4 state: By a response of B terminal, a transition is effected in the course of communicating between A and B terminals.

4→0 state: By cutting off A terminal, both A and B terminals are released.

The present invention is not limited to the embodiments described above, and a terminal start and stop can be simultaneously simulated in combination to automatically verify whether or not a terminal start and stop control are included in the task module of the call processing program.

What is claimed is:

1. An automatic terminal start/stop verification system using a call processing simulator, comprising:

a terminal start/stop simulation unit which simulates a task module of a call processing program for an exchange having terminals, call processors which proces and control calls, line processors controlled by said call processors to control said terminals, and a terminal management data file which stores data on the busy/idle states of said terminals;

a start/stop write macro name holding unit which holds the names of macros for the writing of start or stop into said terminal management data file;

a start/stop order name holding unit which holds the names of orders, for start or stop, to said line processors; and said terminal start/stop simulation unit automatically detects errors in said task module, by referring to said start/stop write macro name holding unit and to said start/stop order name holding unit, an omission of the writing of start or stop into said terminal management data file for start or stop of a terminal as well as of a start or a stop order to said line processors.

2. An automatic terminal start/stop verification system as set forth in claim 1, further comprising a data holding unit which temporarily holds terminal information, said terminal start/stop simulation unit holding start and stop data for every terminal class, based on the name of a macro for the writing of start or stop into said terminal management data file and the name of a start or stop order to said line processors and which are extracted from said task module of the call processing program, and automatically detecting, based on the pattern of the start and stop data, an omission of the macro, or an order, for start or stop of a terminal.

* * * * *

UNITED STATES PATENT AND TRADEMARK OFFICE
CERTIFICATE OF CORRECTION

PATENT NO. : 5,295,177
DATED : Mar. 15, 1994
INVENTOR(S) : KAKEMIZU et al.

It is certified that error appears in the above-indentified patent and that said Letters Patent is hereby corrected as shown below:

TITLE PAGE: [56] References Cited, change "4,640,784" to --4,680,784--.

Col. 9, line 28 (claim 1, line 6), change "proces" to --process--.

Signed and Sealed this

Fifteenth Day of August, 1995

Attest:

BRUCE LEHMAN

*Attesting Officer*     *Commissioner of Patents and Trademarks*